(12) United States Patent  (10) Patent No.: US 9,462,746 B1
Gerhardson et al.  (45) Date of Patent: Oct. 11, 2016

(54) OUTDOOR POWER EQUIPMENT UNIT HAVING ENCAPSULATED, HOUSING FREE ELECTRONIC CONTROLLER

(75) Inventors: Richard D. Gerhardson, Bloomington, MN (US); Timothy P. Sosnowski, Eden Prairie, MN (US); Craig R. Schaler, Eagan, MN (US); James R. Gaebel, Eden Prairie, MN (US); Rex R. Bergsten, Burnsville, MN (US)

(73) Assignee: The Toro Company, Bloomington, MN (US)

( * ) Notice: Subject to any disclaimer, the term of this patent is extended or adjusted under 35 U.S.C. 154(b) by 2125 days.

(21) Appl. No.: 11/373,857

(22) Filed: Mar. 10, 2006

(51) Int. Cl.
*A01D 41/127* (2006.01)
*A01D 34/00* (2006.01)

(52) U.S. Cl.
CPC ................... *A01D 34/006* (2013.01)

(58) Field of Classification Search
CPC .................................................... A01D 41/127
USPC ........................................ 56/1, 10.1, 10.2 R
See application file for complete search history.

(56) References Cited

U.S. PATENT DOCUMENTS

| | | | |
|---|---|---|---|
| 4,853,856 A * | 8/1989 | Hanway ........................... | 701/35 |
| 5,046,007 A * | 9/1991 | McCrery et al. ................ | 701/35 |
| 5,394,678 A * | 3/1995 | Lonn et al. ................. | 56/10.2 H |
| 5,497,604 A * | 3/1996 | Lonn ........................... | 56/10.2 H |
| 5,644,491 A * | 7/1997 | Fiske et al. .................... | 701/102 |
| 5,657,224 A * | 8/1997 | Lonn et al. ...................... | 701/29 |
| 5,743,347 A * | 4/1998 | Gingerich ..................... | 180/65.1 |
| 6,082,084 A * | 7/2000 | Reimers et al. ............... | 56/11.9 |
| 6,609,357 B1 * | 8/2003 | Davis et al. ................ | 56/10.2 A |
| 7,076,348 B2 * | 7/2006 | Bucher et al. .................. | 701/35 |
| 2005/0053447 A1 * | 3/2005 | Bucher et al. ................ | 411/470 |

* cited by examiner

*Primary Examiner* — Thomas B Will
*Assistant Examiner* — Mai Nguyen
(74) *Attorney, Agent, or Firm* — James W. Miller

(57) ABSTRACT

This invention relates to an outdoor power equipment unit, such as a mower, having an electronic controller comprising a circuit board with a plurality of connector pins affixed thereto and with a connector housing surrounding the pins. A Macromelt overmold encapsulates the circuit board and is bonded to the connector housing to form a controller that needs no external housing and no separate wire harness extending from the connector pins to the circuit board. The controller can log the length of time of various operations of the unit as well as the number of various occurrences. In addition, the controller can prevent overheating by automatically disabling operation of the working implement carried by the unit but permitting continued operation of the prime mover when overheating of the prime mover is detected.

3 Claims, 7 Drawing Sheets

OUTDOOR POWER EQUIPMENT UNIT HAVING ENCAPSULATED, HOUSING FREE ELECTRONIC CONTROLLER

TECHNICAL FIELD

This invention relates to an outdoor power equipment unit such as a mower for cutting grass. More particularly, this invention relates to an electronic controller used on the mower for controlling various aspects of the operation of the mower.

BACKGROUND OF THE INVENTION

Riding lawn mowers are well known in the turf care industry for performing a turf maintenance operation, namely for cutting grass. Such lawn mowers carry one or more suitable grass cutting units. The grass cutting units are vertically movable between a lowered grass cutting position and a raised transport position. The grass cutting units are also capable of selective operation, namely they can be started and stopped, at the discretion of the operator.

Electronic controllers are commonly used on such lawn mowers to perform various functions. These functions include receiving data from various sensors installed on the mower to monitor and track the operational condition of various components on the mower. If certain components malfunction, the controller will often disable their continued operation and store error codes reporting the fault. Such error codes can later be retrieved by a technician seeking to diagnose and repair the component.

In addition, the electronic controller often serves as the control interface between various manually operated controls on the mower and the components that are operated by these controls. For example, the mower typically includes controls for lifting and lowering the cutting units and for starting and stopping the cutting units. The movement of such controls is sensed and reported to the controller and the controller then sends corresponding commands to the cutting units to effect the desired action. If the cutting units are to be stopped, the controller will send a signal to a valve or switch to stop the flow of power to the cutting units.

In keeping with the disparate functions served by the controller, the controller embodies sophisticated microprocessor based technology incorporated on a printed circuit board. Such a circuit board is placed within an outer housing and a potting compound is often injected into the housing to seal the circuit board in a waterproof manner. Conventional pin type connectors having female and male halves are used to connect the controller to the various sensors and components on the mower. Such connectors are typically separate from the controller and the sensors and components and are connected thereto by wiring harnesses.

While known electronic controllers of this type are effective, they are quite costly. They require an appropriate printed circuit board that is potted into a surrounding outer housing. A first wiring harness is connected to leads on the printed circuit board and then to one of the connector halves to electronically join the circuit board to the connector half. The other connector half has to be joined to the sensors and/or components by a second wiring harness. The need for two such harnesses and the need to join the first wiring harness to the printed circuit board increases the cost and complexity of the controller.

Finally, with microprocessor based technology of this type, it is possible to monitor numerous components and to track and record large amounts of information. However, to date, such controllers as used on outdoor power equipment units such as mowers do not monitor, track and record much more than rudimentary information. Thus, there is a need in the art for an electronic controller for on outdoor power equipment unit that is less complex and costly and that will monitor, track and record a large number of operational conditions.

SUMMARY OF THE INVENTION

One aspect of this invention relates to an outdoor power equipment unit which comprises a frame supported for movement over the ground by a plurality of wheels. A prime mover is carried on the frame. At least some of the wheels comprise drive wheels that are driven by the prime mover for propelling the frame over the ground. At least one implement is carried on the frame and driven by the prime mover for performing a ground or turf grooming or working operation. An electronic controller is carried on the frame. The controller comprises a printed circuit board having a plurality of electronic components including a microprocessor mounted for receiving information and providing control instructions. A plurality of connecting pins are directly affixed to the circuit board. A connector housing of a first connector half surrounds the connecting pins and is affixed to the circuit board. An overmolded polyamide encapsulation encloses the printed circuit board and the surface mounted electronic components but does not enclose an open top of the connector housing. Thus, the connecting pins are accessible to allow a second connector half and the first connector half to be plugged into one another to electrically connect the circuit board to a plurality of electrical devices carried on the frame. The polyamide encapsulation forms the outer housing of the electronic controller.

Another aspect of this invention relates to an outdoor power equipment unit which comprises a frame supported for movement over the ground by a plurality of wheels. A prime mover is carried on the frame. At least some of the wheels comprise drive wheels that are driven by the prime mover for propelling the frame over the ground. At least one implement is carried on the frame and driven by the prime mover for performing a ground or turf grooming or working operation. An electronic controller is carried on the frame. The controller comprises a memory for logging the following: the length of time in a transport cycle in which the prime mover is running and the drive wheels are being driven but the implement is not in operation, and the length of time in a work cycle in which the prime mover is running and both the drive wheels and the implement are being driven.

Yet another aspect of this invention relates to an outdoor power equipment unit which comprises a frame supported for movement over the ground by a plurality of wheels. A prime mover is carried on the frame. At least some of the wheels comprise drive wheels that are driven by the prime mover for propelling the frame over the ground. At least one implement is carried on the frame and driven by the prime mover for performing a ground or turf grooming or working operation. An electronic controller is carried on the frame. The controller includes an overheat prevention system that disables operation of the implement while permitting continue operation of the prime mover and the drive wheels when overheating of the prime mover is detected.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
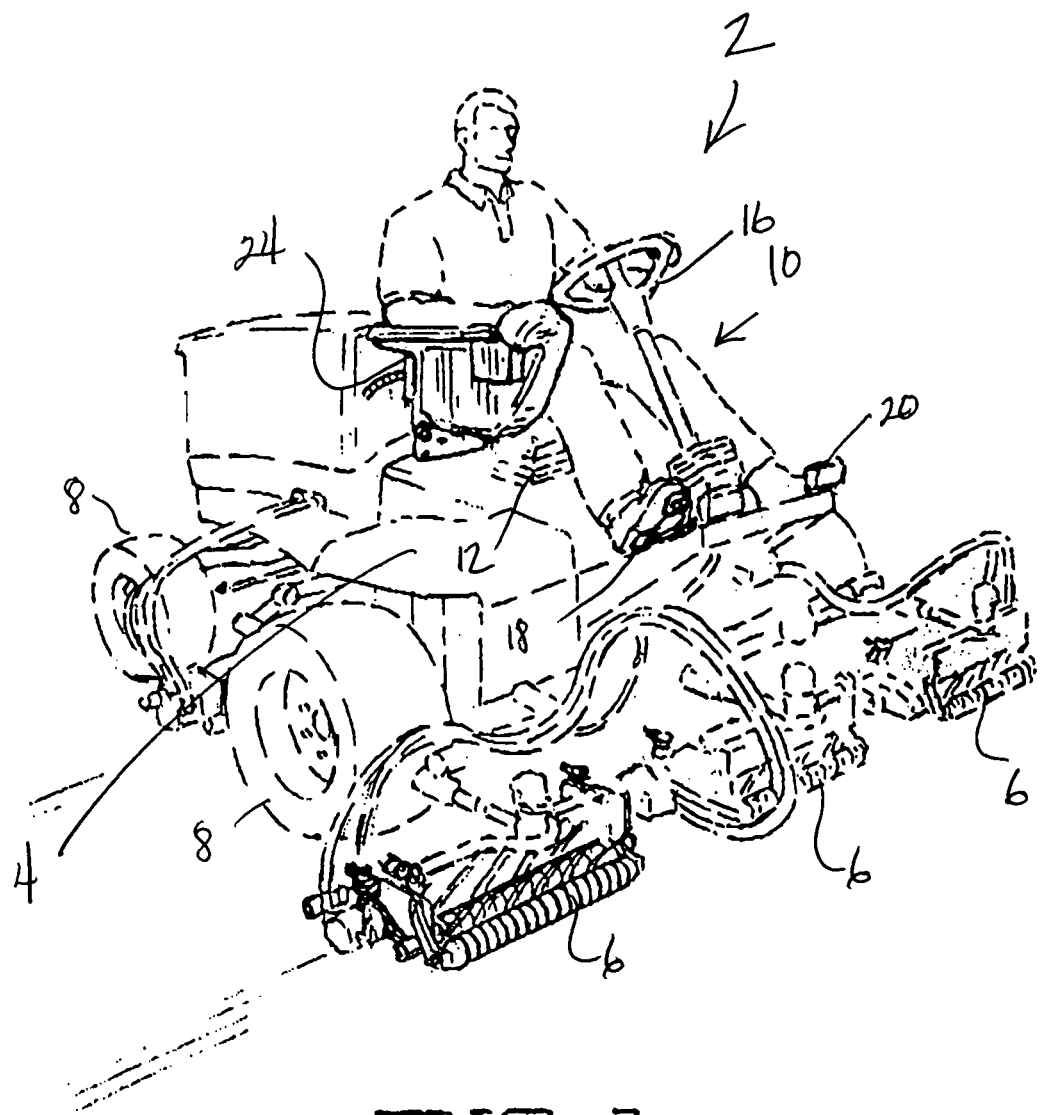
FIG. 1 is a perspective view of one type of outdoor power equipment unit, namely a riding lawn mower, that uses the electronic controller of this invention.
Figure 2:
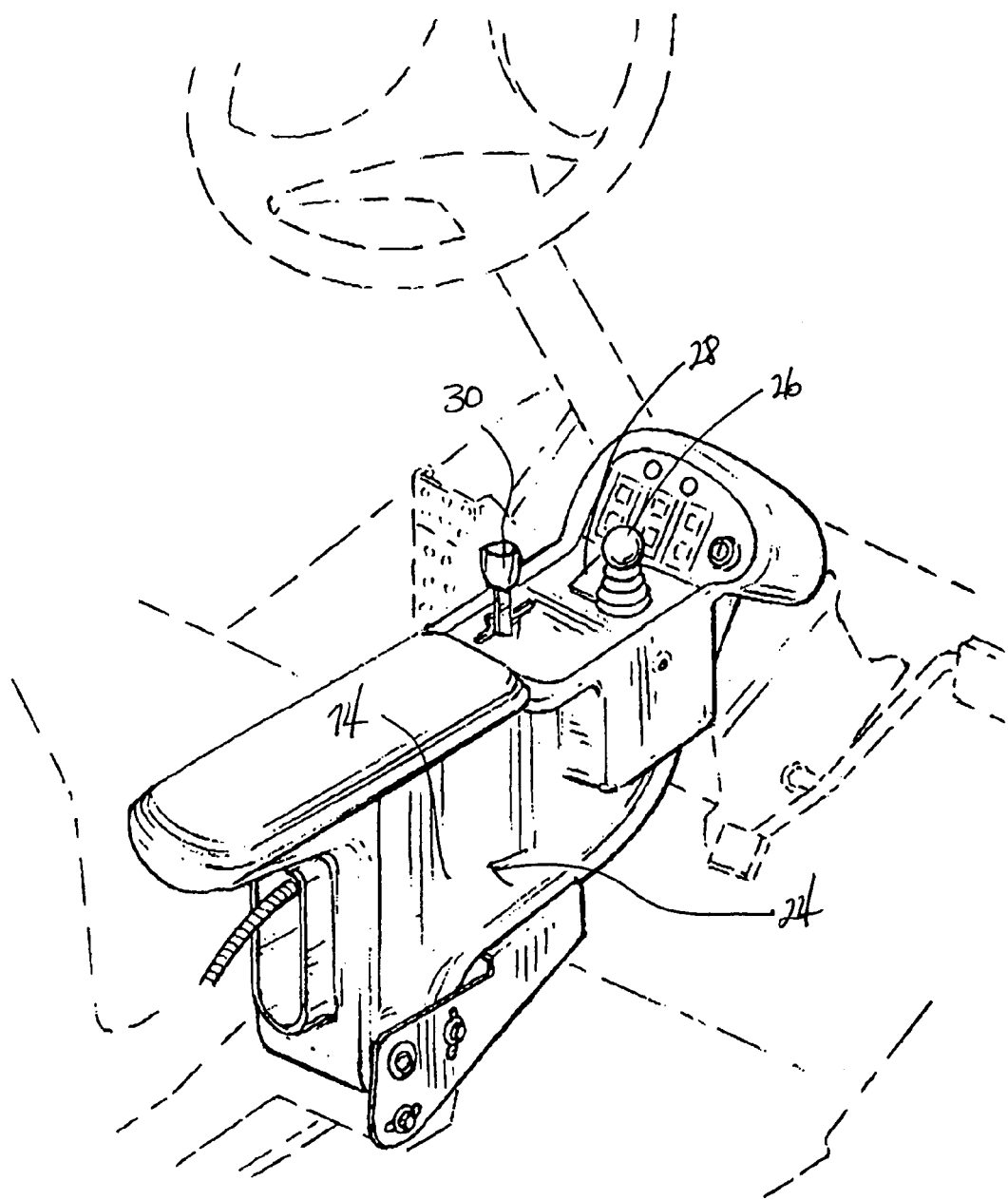
FIG. 2 is an enlarged perspective view of an armrest used on the mower of FIG. 1, the armrest having various operational controls for controlling the speed of the engine and the operation of the cutting units.
Figure 3:
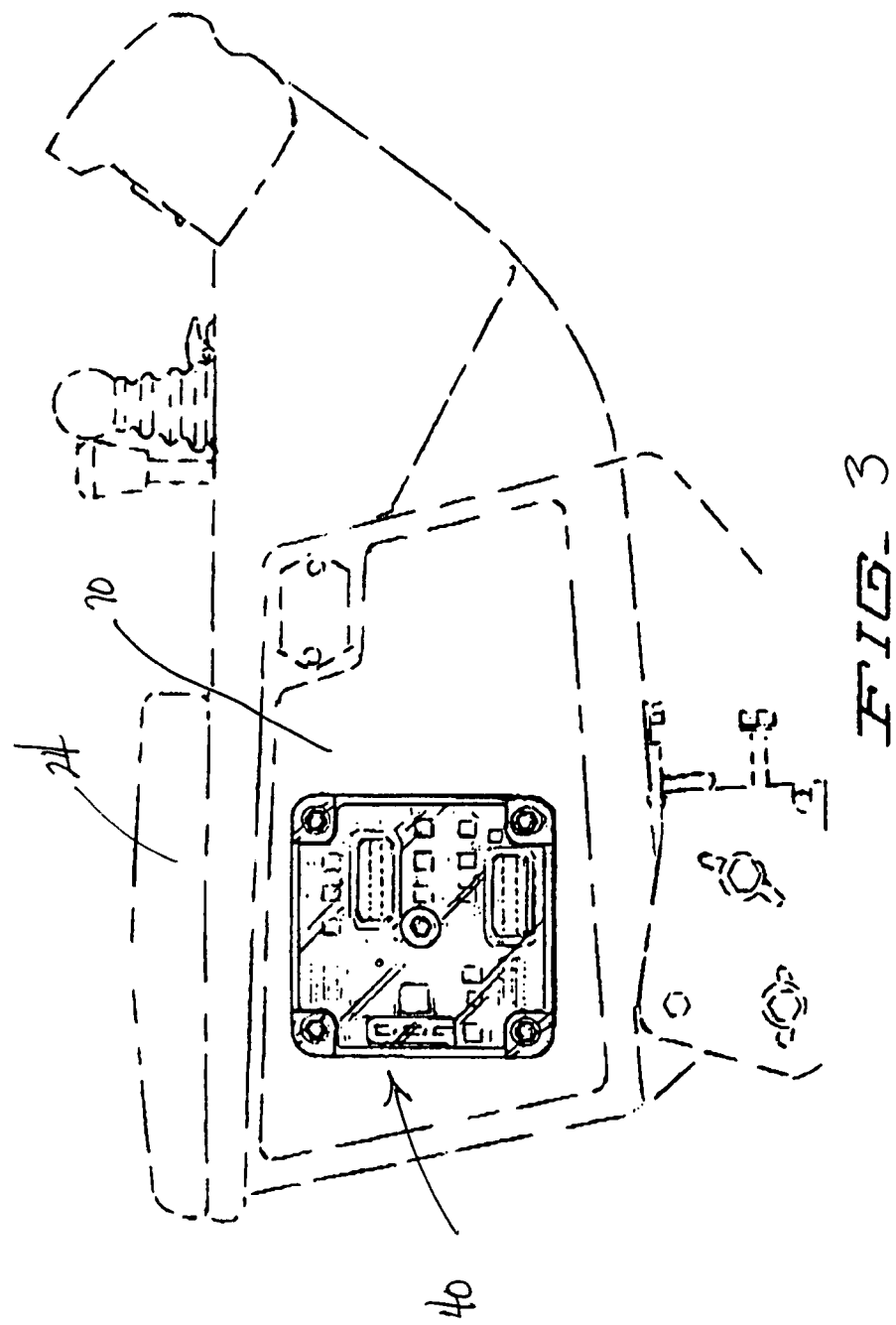
FIG. 3 is a partial side elevational view of the armrest shown in FIG. 2, particularly illustrating the electronic controller of this invention placed or mounted in an recess in one side of the armrest with the access cover or panel that normally closes the recess having been removed.

FIG. 1 shows an outdoor power equipment unit of the type with which the electronic controller 40 of this invention may be used. The outdoor power equipment unit as shown herein comprises a riding mower. However, electronic controller 40 of this invention is not limited to being used on a riding mower, but could be used on other types of outdoor power equipment units.

Mower 2 includes a frame 4 that carries one or more grass cutting units 6. A plurality of wheels 8 support frame 4 for rolling over the ground. An operator's station 10 is provided on frame 4 having a seat 12 for carrying a seated operator. A prime mover (not shown), such as an internal combustion or diesel engine, is carried on frame 4 behind operator's station 10. A traction system drives at least some of the wheels 8 of frame 4 to cause mower 2 to be self-propelled.

The operator selectively controls the movement of frame 4 through a steering wheel 16, a traction pedal 18 and a brake pedal 20 arranged in advance of operator's seat 12. An armrest 24 is placed adjacent one side of operator's seat 20. Armrest 24 carries various operational controls for controlling the operation of cutting units 6, namely a lift and lower control 26 for lifting and lowering cutting units 6 and a rocker switch 28 for engaging and disengaging cutting units 6. Armrest 24 also includes an engine throttle 30.

This invention relates to electronic controller 40 used on mower 2. Controller 40 may be used with other types of riding mowers, with non-riding mowers, and with other types of outdoor power equipment units that perform ground or turf working or grooming operations. Controller 40 of this invention is particularly adapted for use with outdoor power equipment units that operate outside in harsh weather conditions and over rough or uneven terrain.

Figure 6:
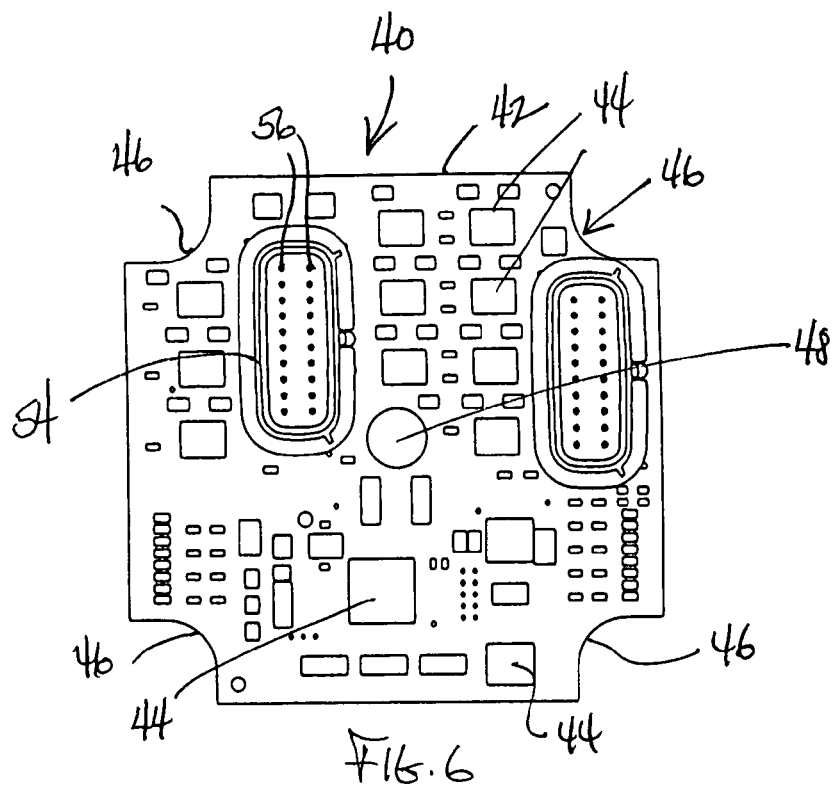
FIG. 6 is a top plan view of a portion of the electronic controller shown in FIG. 3, particularly illustrating the top of the printed circuit board used in the electronic controller prior to the circuit board being provided with a Macromelt overmold.
Figure 7:
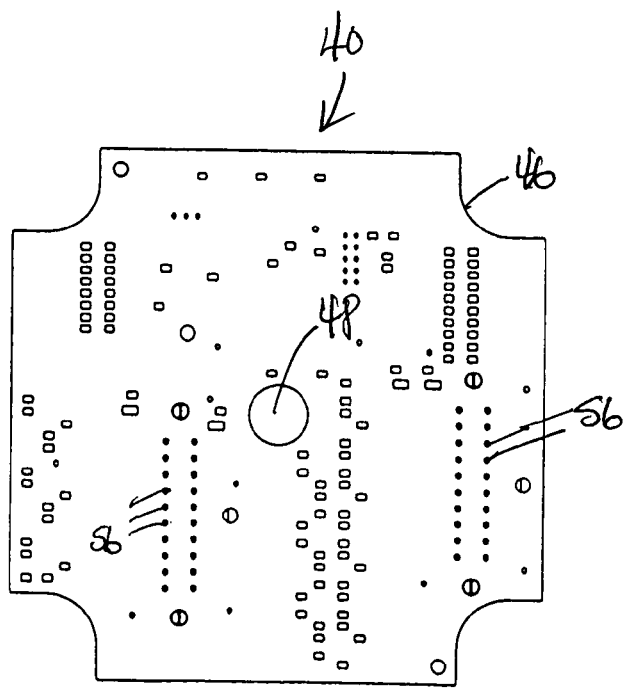
FIG. 7 is a bottom plan view of the circuit board similar to FIG. 6 but showing the bottom of the circuit board and not the top of the circuit board.

Referring now to FIGS. 6 and 7, controller 40 of this invention comprises a printed circuit board 42 having one or more surface mounted microprocessors 44 thereon. Microprocessors 44 provide a logic and control means for controller 40. In addition, circuit board 42 carries numerous other electronic components 44 mounted on the surface thereof, such as transistors, memory chips, etc. Some of these components 44 will protrude above and below the thickness of circuit board 42. Circuit board 42 is provided with scalloped corners 46 and with a central hole 48 in the middle thereof. While surface mounted electronic components are shown on circuit board 42, such electronic components need not be surface mounted as long as they are carried by circuit board 42.

A pair of pin type wire connectors 50 are used to transmit data to and from circuit board 42. In controller 40 of this invention, one half of each such connector 50, namely the female half 52 of connector 50, is directly affixed to circuit board 42. Each female connector half 52 includes a connector housing 54 that encloses an array of metallic, upright, male connector pins 56. Pins 56 are soldered or otherwise fixedly secured to various leads (not shown) formed in circuit board 42 during the assembly of circuit board 42.

At some point after pins 56 are so affixed, connector housing 54 of each female connector half 52 is snapped onto circuit board 42 surrounding the array of pins 56. If so desired, each connector housing 54 could further be adhesively secured to circuit board 42. In any event, because of this method of construction, i.e. affixing pins 56 and connector housing 54 directly to circuit board 42, there is no need for any wire harness between female connector halves 52 and circuit board 42.

Any suitable wire connector 50 could be used having a female half enclosing a plurality of pins 56 and a male half (not shown) having a plurality of holes or female pins (not shown) which receive male pins 56 when the female and male halves are plugged together. If desired, each connector half could have a snap fit tending to hold the connector halves together. One suitable connector of this type is manufactured and sold by Molex. Connector housing 54 is made of polycarbonate, a rigid plastic material.

Figure 4:
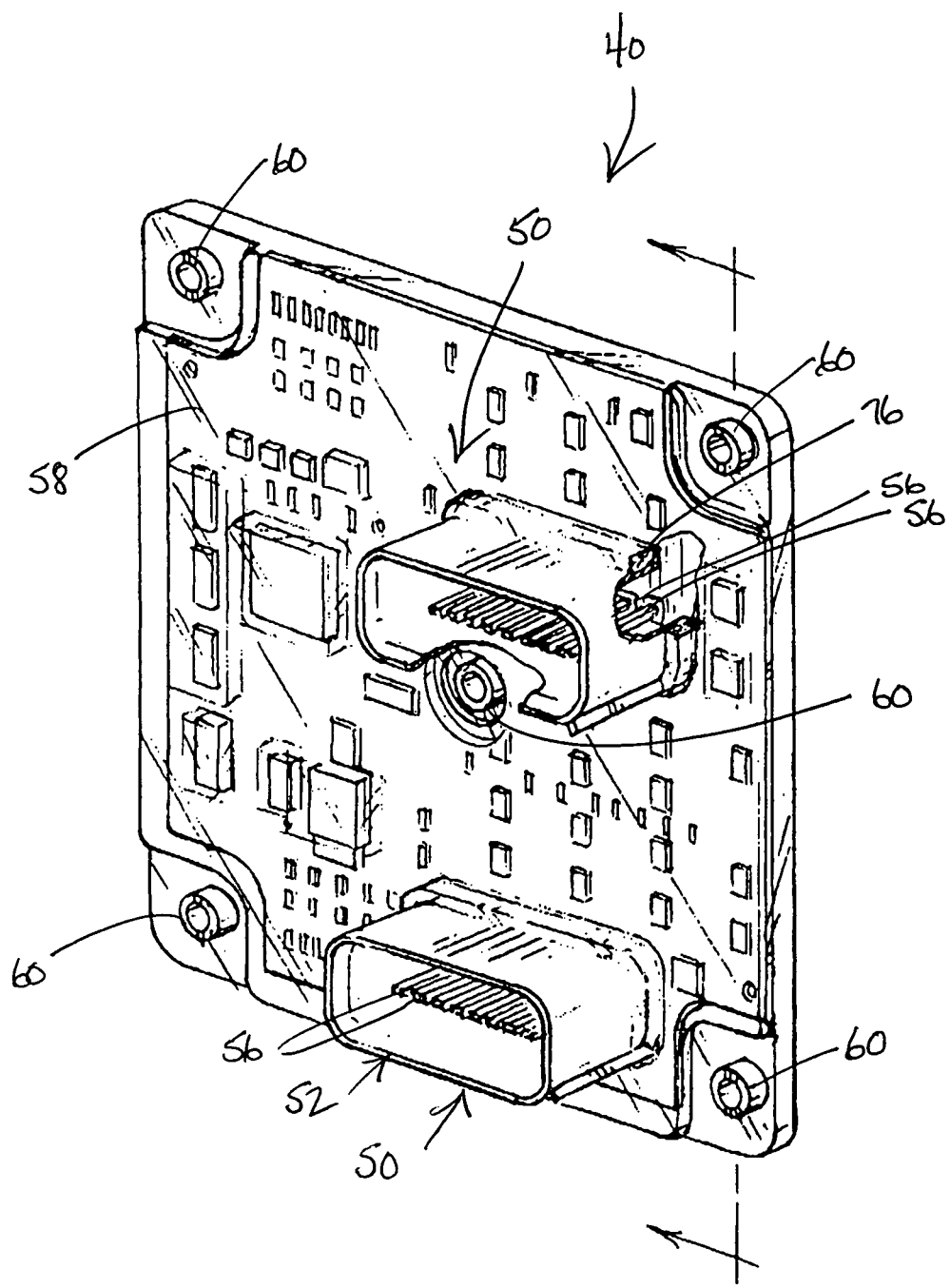
FIG. 4 is a perspective view of the electronic controller shown in FIG. 3.
Figure 5:
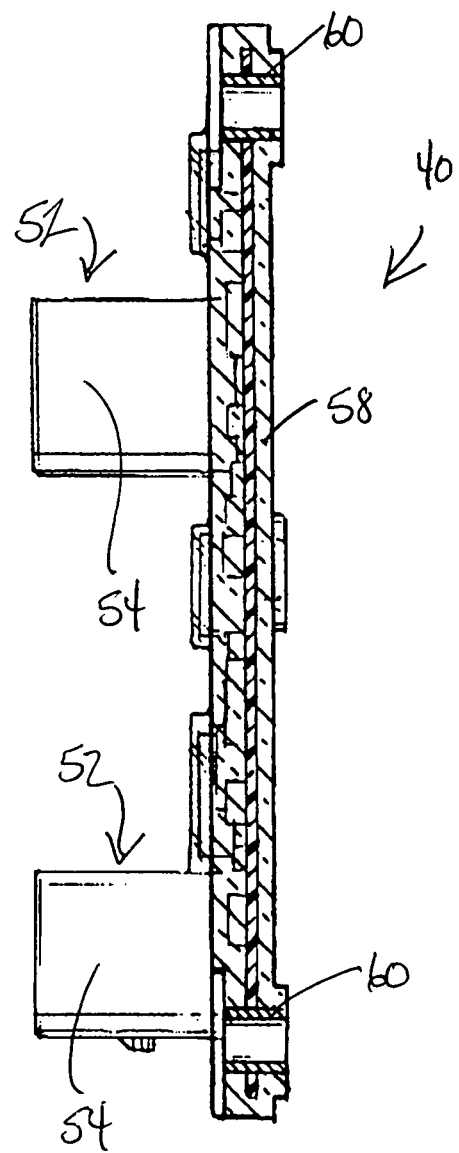
FIG. 5 is a cross-sectional view of the electronic controller shown in FIG. 3 taken along lines 5-5 in FIG. 4.

After circuit board 42 is manufactured with pins 56 affixed thereto and connector housings 54 secured thereto surrounding pins 56, the entire circuit board 42 is encapsulated or overmolded with a high performance polyamide adhesive known as Macromelt, sold by Henkel. This is done in a high temperature, low-pressure molding process. The Cavist Company of Reno, Nev. is one such company that uses Macromelt in an overmolding process. When the Macromelt material cools it will fully encapsulate both the top and bottom of the entire surface of circuit board 42 as shown in FIGS. 4 and 5. However, connector housings 54 of female connector halves 52 will protrude up through the Macromelt overmold 58 and connector pins 56 contained inside female connector halves 52 will be accessible for connection to the male connector half.

A plurality of mounting grommets 60 can be appropriately positioned in recessed corners 46 and central hole 48 provided in circuit board 42. These grommets 60 are preferably metallic grommets. Overmold 58 will encapsulate grommets 60 inside overmold 58 to make grommets 60 part of overmold 58. However, overmold 58 will not flow into or through the central open bore of grommets 60. Thus, when overmold 58 is completed, the tops of the connector housings 54 of female connector halves 52 will not be encapsulated by overmold 58 and grommets 60, while encapsulated in overmold 58, will extend through the thickness of overmold 58 to form suitable mounting passages in overmold 58. Controller 40 of this invention comprises circuit board 42 and its encapsulating overmold 58.

Controller 40 is now ready for mounting in mower 2. For example, controller 40 can be mounted in a recess 70 in armrest 24 which recess 70 is normally covered by access cover or panel 74. With access cover or panel 72 removed, controller 40 is simply bolted in place with machine bolts or the like passing through the mounting passages formed by grommets 60 into suitable threaded apertures formed in armrest 24. Then, the other halves of connector 50, namely the male connector halves, are simply plugged into female connector halves 52 provided on circuit board 42. This will electrically connect microprocessor 44 and the other electronic components on circuit board 42 both to a source of electrical power as well as to the various components, sensors, displays, and the like that communicate with microprocessor 44 and/or are controlled by microprocessor 44 or receive information from microprocessor 44.

Controller 40 of this invention is very cost effective. It does not require the use of an external housing to house circuit board 42. Overmold 58 becomes the housing of controller 40 and grommets 60 molded into overmold 58 become the mounts for controller 40. Since one half of connectors 50, namely female connector halves 52, are directly mounted to circuit board 42 by having the pins 56 thereof directly staked or otherwise connected to the leads on circuit board 42 at the time of manufacture of circuit board 42, there is no need for a separate wire harness between connectors 50 and circuit board 42. Accordingly, the cost to manufacture controller 40 is considerably reduced, while still providing a durable and strong controller 40 suited for use in outdoor power equipment units such as mower 2.

The Applicants have also discovered that the seal and bond between overmold 58 can be improved if a ring 76 of polyolefin material is molded around the base 55 of connector housing 54 prior to joining connector housing 54 to circuit board 42. A portion of such a ring 76 is shown in FIG. 4 on base 55 of one of the connector housings 54.

Figure 8:
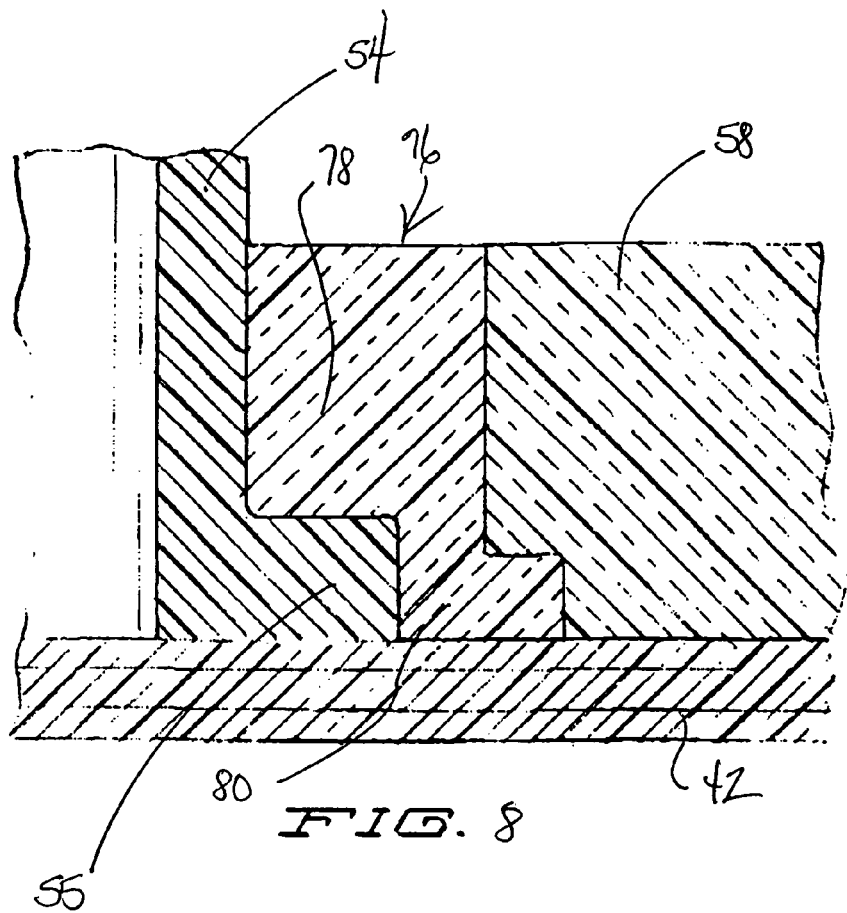
FIG. 8 is a partial cross-sectional view of a lower portion of a connector housing of a female connector half of the controller of FIG. 3, particularly illustrating a first side profile of a polyolefin ring placed between the connector housing and the Macromelt overmold.
Figure 9:
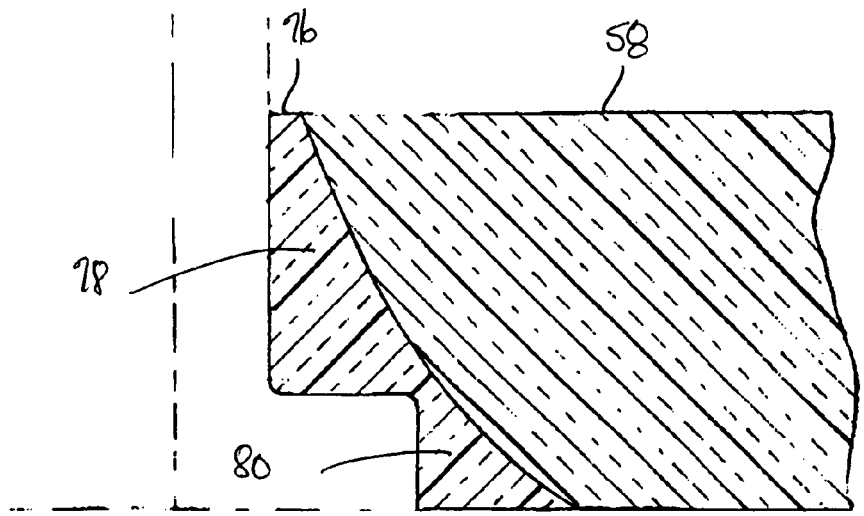
FIG. 9 is a view similar to FIG. 8, but particularly illustrating a second side profile of a polyolefin ring placed between the connector housing and the Macromelt overmold.

FIGS. 8 and 9 disclose two side profiles used by the Applicants for polyolefin ring 76. The major difference between these two side profiles is the mass ration between the polyolefin and the adjacent Macromelt overmold 58. In the profile of FIG. 9, there is less polyolefin than in the profile of FIG. 8. With the profile of FIG. 9, the hot overmold 58 is better able to remelt the cold polyolefin ring 76 and achieve a bond between the two than in the profile of FIG. 8. Thus, while a polyolefin ring 76 with the profile of FIG. 8 is better than using no ring 76 at all, a polyolefin ring 76 having the profile of FIG. 9 is preferred since it achieves the best seal between connector housing 54 and overmold 58.

In the profile of FIG. 8, polyolefin ring 76 forms substantially constant thickness boundary layers 78 and 80 relative to the lower portion of connector housing 54 and base 55. In the preferred profile of FIG. 9, ring 76 is curved outwardly relative to connector housing 54 from the top to the bottom of ring 76. Thus, the boundary layers 78 and 80 formed between ring 76 and the lower portion of connector housing 54 and base 55 each now progressively increase in thickness from the top to the bottom of each boundary layer.

A microprocessor based controller 40 of the type disclosed herein is suitable for logging more information regarding the amount of time that mower 2 is being used in various modes of operation. For example, controller 40 can log the length of time for the following conditions:

the length of time the key switch is on to indicate the length of time that the electrical system, including controller 40, has been powered;

the length of time the prime mover is running but the drive wheels are not being driven and the cutting units are not in operation, i.e. mower 2 is idling and stationary;

the length of time the prime mover is running and the drive wheels are being driven but the cutting units are not in operation, i.e. mower 2 is being driven in a transport mode;

the length of time the prime mover is running, the drive wheels are being driven and the cutting units are in operation mowing grass, i.e. mower 2 is being driven in its cutting mode; and the length of time the cutting reels are being operated in reverse in a backlapping operation.

This time logging information can be used to help determine more precisely when a mower 2 might need to be serviced. Unlike conventional mowers with an hour meter that reports only the length of time the key switch has been on or the engine has run, controller 40 of this invention will give more precise information about how long mower 2' has been operated in both its transport and cutting modes. Thus, a user of mower 2 can download and monitor this information from controller 40 and determine to service mower 40 only after a certain number of mowing hours has been reached or only after a certain number of transport and mowing hours has been reached.

In addition to time logging, controller 40 is well suited to event logging, namely counting the number of times a particular event has occurred. For example, controller 40 desirably logs the following events:

the number of glow cycles in the case where the prime mover is a diesel engine;

the number of start cycles, i.e. the number of times the prime mover has been started;

the number of mow cycles, i.e. the number of times the cutting units have been operated forwardly in a grass mowing operation; and the number of backlap cycles, i.e. the number of times the cutting units have been operated reversely in a backlapping operation.

In addition, controller 40 can be connected to a sensor (not shown) that monitors the heat in the cooling system to the prime mover. When this sensor indicates an overheating situation, controller 40 will override rocker switch 28 and interrupt or disable the operation of cutting units 6 even if the rocker switch 28 is calling for such operation. Mower 2 will still be capable of being propelled by its drive system, but cutting units 6 will automatically shut off in this overheating situation.

This should alert the driver to an overheating situation, which may also be signalled by a visual or audible alarm as will be described hereafter. The driver can then continue to drive or can stop mower 2 while the prime mover continues to run. Since the major loads imposed by cutting units 6 are now not present, the continued operation of the cooling system for the prime mover will quickly and effectively lower the temperature of the prime mover and rectify the overheating situation. This is an improvement over the prior art practice of simply shutting off the prime mover when an overheating situation occurs since this also shuts off the cooling system letting residual heat remain in the prime mover.

In fact, in a developing overheating situation, controller 40 first preferably provides the operator with a visual or audible alarm at a certain temperature level of the prime mover, namely at a high but still acceptable temperature level, to allow the operator to voluntarily take corrective action. If the operator does not do so, then the automatic disabling of the operation of the cutting units will be done by controller 40 when the temperature level of the prime mover reaches a higher and unacceptable temperature level. This will take place automatically and override any attempt by the operator to ignore the overheating situation—the cutting units 6 will turn off and the operator will no longer be able to mow. Since many mowers 2 of this type are operated by operators who do not own the equipment, this will prevent damage to the prime mover from an inadvertent or negligent operator and preserve the owner's capital investment.

The event logging capability of controller 40 can also log the number of times an overheating warning is generated to the operator as well as the number of times an overheating situation has actually occurred and the cutting units have been shut down. This information can alert the owner of the equipment to a systemic problem in the cooling system that may require immediate service. It will also alert the owner to the fact that the equipment is not being operated by the operator in a safe and prudent manner. Such information can allow the owner to instruct the operator to change his or her driving practices.

Finally, most mowers 2 of this type have hydraulic leak detectors for sensing hydraulic oil leaks from the hydraulic system of mower 2. Controller 40 can also conveniently log and report the number of times a hydraulic leak has occurred. Again, this may alert the owner of mower 2 to a problem in the hydraulic system that needs immediate attention.

Various modifications other than those described above will be apparent to those in the art. Thus, this invention will be limited only by the appended claims.

We claim:

1. A method of deriving time information regarding various different elapsed time intervals in which a mower is operated in different modes, which comprises:
    (a) providing a mower having a frame supported for movement over the ground by a plurality of wheels, a prime mover carried on the frame, at least some of the wheels comprising drive wheels that are driven by the prime mover to self propel the frame over the ground, a grass cutting unit carried on the frame and being driven by the prime mover to cut grass, an electrical system carried on the frame with the electrical system being turned on and off by a key switch, and an electronic controller carried on the frame;
    (b) operating the mower in various modes comprising:
        (i) a switch on mode in which the key switch is turned to an on position to provide electrical power to the electrical system of the mower;
        (ii) an idling mode in which the prime mover is in operation with the drive wheels and the grass cutting unit both being at rest to represent a condition in which the prime mover is in operation with the mower being stationary at one place without cutting grass;
        (iii) a transport mode in which both the prime mover and the drive wheels are simultaneously in operation with the grass cutting unit not being in operation to represent a condition in which the mower is being self propelled from one place to another without cutting grass; and
        (iv) a cutting mode in which the prime mover, the drive wheels, and the grass cutting unit are all simultaneously in operation to represent a condition in which the mower is being self propelled from one place to another while cutting grass;
    (c) using the electronic controller to determine at least the following time durations:
        (i) a transport mode time duration comprising an elapsed time interval that measures how long the mower was operated in the transport mode;
        (ii) a cutting mode time duration comprising an elapsed time interval that measures how long the mower was operated in the cutting mode;
    (d) storing the transport mode time duration and the cutting mode time duration in the electronic controller; and
    (e) downloading from the electronic controller to a user of the mower both the transport mode time duration and the cutting mode time duration.

2. The method of claim 1, further including using the determining, storing and downloading steps, respectively, to determine, store and download an idling mode time duration comprising an elapsed time interval that measures how long the mower was operated in the idling mode.

3. The method of claim 2, further including using the determining, storing and downloading steps, respectively, to determine, store and download a switch on mode time duration comprising an elapsed time interval that measures how long the key switch of the mower was placed in the on position.

* * * * *

UNITED STATES PATENT AND TRADEMARK OFFICE
CERTIFICATE OF CORRECTION

PATENT NO. : 9,462,746 B1
APPLICATION NO. : 11/373857
DATED : October 11, 2016
INVENTOR(S) : Richard D. Gerhardson et al.

Page 1 of 1

It is certified that error appears in the above-identified patent and that said Letters Patent is hereby corrected as shown below:

On the Title Page

Item [75] Inventors, please delete as named inventors "Craig R. Schaler, Eagan, MN (US)" and "Rex R. Bergsten, Burnsville, MN (US)".

Signed and Sealed this
Twenty-sixth Day of June, 2018

Andrei Iancu
*Director of the United States Patent and Trademark Office*